2,793,201

PERHALOACRYLYL PEROXIDES IN FLUORO-OLEFIN POLYMERIZATIONS

Carl I. Gochenour, William Eric Ashton, and Charles F. Baranauckas, Niagara Falls, N. Y., assignors to Hooker Electrochemical Company, Niagara Falls, N. Y., a corporation of New York No Drawing. Application May 10, 1954,
Serial No. 428,786

9 Claims. (Cl. 260—92.1)

This invention relates to an improved process for effecting the polymerization of perhalo-olefins especially perfluoro- chloro- olefines such as chlorotrifluoroethylene and unsym-dichloro-difluoroethylene. More particularly, this invention relates to an improved process for effecting the polymerization of chlorotrifluoroethylene which eliminates the necessity for using expensive processing techniques by using a bis-(perhaloacrylyl) peroxide, such as bis-(perchloroacrylyl) peroxide, as a polymerization promoter to yield desirable products which are stable polymers and which contain substantially no hydrogen or other reactive groups.

Polymers and copolymers formed from perhalo-olefins, such as chlorotrifluoroethylene, have become of significant commercial importance primarily because of their unusual resistance to such corrosive chemicals as oxidizing and reducing agents, chlorine, fluorine, mineral acids, corrosive halides, etc., and also because of their good thermal stability. Improved chemical stability is known to be imparted into the polymers of these materials when their monomers are polymerized in the presence of a bis-(perhaloacetyl) peroxide polymerization promoter, such as bis-(trichloroacetyl) peroxide (commonly referred to merely as trichloroacetyl peroxide). The use of such bis-(perhaloacetyl) peroxide polymerization promoters eliminates the amount of reactive hydrogen which would have been combined into the final polymer, by way of the promoter being chemically combined, if the polymerization had been effected in the presence of a hydrogen-containing promoter such as acetyl peroxide or benzoyl peroxide. However, although the use of bis-(perhaloacetyl) peroxide as the polymerization promoter for making polymers of chlorotrifluoroethylene and similar type compounds has solved certain problems with respect to improving the chemical stability characteristics of the final polymer obtained, it has left room for further improvement in chemical stability and has created still other problems with respect to the processing and handling techniques which must be employed if successfull results are to be obtained.

When using bis-(trichloroacetyl) peroxide to polymerize chlorotrifluoroethylene to make high molecular weight solid polymer, the polymerization process must necessarily be carried out at sufficiently low temperatures to regulate the decomposition of said peroxide. In fact, it has been necessary to employ polymerization temperatures on the order of minus 20 degrees centigrade so that the reaction may proceed to obtain the desired polymerization product and also to avoid undue risk of explosion and other hazards known to be associated with the use of such peroxide promoters. To do this on a commercial scale operation, it has been necessary to employ expensive refrigeration techniques in the process for polymerizing chlorotrifluoroethylene to a solid product using bis-(trichloroacetyl) peroxide as the promoter. Because of this, the process has been expensive and difficult and requires considerable direct attention in actual operation. Further, the use of bis-(trichloroacetyl) peroxide as a promoter in this polymerization has also necessitated the use of additional separate refrigeration equipment for the storage of that material because bis-(trichloroacetyl) peroxide is characterized by having considerable thermal instability and is capable of decomposing with explosive violence even when in solution at zero degrees centigrade. United States Patent 2,580,358 discloses that trichloroacetyl peroxide can be safely handled only at sub-normal temperatures and that careful manipulation is required even at temperatures below zero degrees centigrade. Also, since trichloroacetyl peroxide has a very rapid rate of decomposition at ordinary temperatures and, to preclude undue deterioration in storage, it is preferably dissolved in a suitable solvent such as trichlorofluoromethane (Freon 11) and stored at low temperature until it is used. A suitable storage temperature is recommended as minus 78 degrees centigrade. Unless the trichloroacetyl peroxide is stored and handled at minus 78 degrees centigrade in dilute solution, i. e., about 2 percent of the peroxide dissolved in trichlorofluoromethane (Freon 11), it is necessary to periodically determine or assay the effectiveness of the promoter to insure the proper concentration with respect to monomer. The dilute solution of promoter increases the quantity of inert solvent in the reaction vessel thus decreasing the productive capacity per unit volume as well as affecting the properties of the polymer produced. More concentrated solutions of trichloroacetyl peroxide should not be stored at minus 78 degrees centigrade because the promoter crystallizes from solution resulting in apparent disadvantages of practical operation and creating additional hazards to operating personnel.

When using trichloroacetyl peroxide in the polymerization of chlorotrifluoroethylene to make low molecular weight polymer which is of liquid or of grease-like consistency, the polymerization process is carried out at elevated temperatures compared to the temperatures used for making solid polymers. However, at the temperatures required to make liquid polymer the trichloroacetyl peroxide polymerization promoter decomposes so quickly that the efficiency of the polymerization is impaired.

There are many other disadvantages associated with the use of trichloroacetyl peroxide as the promoter for polymerizing chlorotrifluoroethylene type monomers to either solid, liquid or grease-like products, as is apparent from the foregoing description, and it is a primary object of this invention to provide a polymerization process and a polymerization promoter to be used therein which possesses the advantages of the halogenated peroxide previously used in the commercial manufacture of the polymers and which also obviates many of the attendant disadvantages, as illustrated above.

These and related objects are accomplished by the present invention which comprises: effecting the polymerization of fluorine containing perhalo-olefins in the presence of a bis-(perhaloacrylyl) peroxide at temperatures between about minus 10 and plus 80 degrees centigrade and recovering polymeric material therefrom. More particularly, this invention comprises the process of effecting the polymerization of chlorotrifluoroethylene in the presence of 0.005 to 5 percent by weight of bis-(trichloroacrylyl) peroxide at a temperature between about minus 20 and plus 80 degrees centigrade and recovering therefrom a polymeric material.

The comparison of the "half-life" of the trichloroacrylyl peroxide polymerization promoter of this invention with that of trichloroacetyl peroxide polymerization promoter of the prior art further illustrates the advantages and results which accrue in accordance with this invention. Table 1 below gives the "half-life" data for trichloroacetyl peroxide against temperature in trichlorofluoromethane solvent.

Table 1.—Trichloroacetyl peroxide

| 99% Decomposed | | 50% Decomposed | |
|---|---|---|---|
| °C. | Time in Hours | °C. | Time in Hours |
| 20 | 2 | 20 | |
| 10 | 4 | 10 | 2 |
| 0 | 25 | 0 | 5 |
| −10 | 160 | −10 | 24 |
| −20 | | −20 | 192 |

Table 2 gives the "half-life" data for trichloroacrylyl peroxide against temperature in trichlorofluoromethane solvent.

Table 2.—Trichloroacrylyl peroxide

| 50% Decomposed | |
|---|---|
| °C. | Time in Hours |
| 70 | 0.8 |
| 60 | 2.3 |
| 50 | 7.5 |
| 40 | 22.0 |

From a comparison of the data given in the foregoing tables, it is apparent that the polymerization promoter of this invention possesses the following advantages over the trichloroacetyl peroxide promoter of the prior art, especially insofar as its utility in the preparation of chlorotrifluoroethylene polymers is concerned. Bis-(perchloroacrylyl) peroxide is much more stable to heat than bis-(perchloroacetyl) peroxide. When the results of the above data are plotted in graphic form, it is found that the relative stability to temperature of bis-(perchloroacrylyl) peroxide is at least 50 centigrade degrees higher than is the stability of bis-(perchloroacetyl) peroxide. This means that if bis-(perchloroacrylyl) peroxide is to be used to effect a polymerization of a perhalo olefin to obtain a polymer of desired molecular weight range, a reaction temperature may be used which is about 50 centigrade degrees higher than that used for effecting the same polymerization to obtain similar results with a promoter of bis-(perchloroacetyl) peroxide. For instance, when it is desired to produce a solid polymer of chlorotrifluoroethylene near room temperature can be used to effect the polymerization with bis-(trichloroacrylyl) peroxide, whereas temperatures substantially below minus 10 degrees centigrade must be used to effect this polymerization when using bis-(perchloroacetyl) peroxide. Considerable savings in refrigeration requirements can be realized from this fact alone. The process itself can be conducted at temperatures nearer to room temperature where ordinary cooling water can be used rather than brine or other coolants. Further, the handling problem which was so serious with bis-(perchloroacetyl) peroxide can be greatly simplified when using the bis-(perhaloacrylyl) peroxides of this invention. For instance, when using bis-(perchloroacrylyl) peroxide it is no longer necessary to store the chemical at such extremely low temperatures as minus 78 degrees centigrade as a 2 percent solution in trichlorofluoromethane, but considerably warmer temperatures can be used such as minus 40 degrees centigrade and more concentrated solutions such as a 16 percent solution in trichlorofluoromethane (Freon 11) can be used and still have it retain its effectiveness as a polymerization promoter and thereby greatly reduce the necessity of periodically assaying the activity of the promoter. As a further illustration of this advantage, for example, a 16 percent solution of bis-(trichloroacrylyl) peroxide in Freon 11 was stored at about minus 15 degrees centigrade for a period of three weeks. At the beginning of the storage period the solution assayed 15.9 percent active peroxide and at the end of the three-week period it was assayed again and found to still assay 15.8 percent active peroxide; whereas, from a study for the "half-life" data on Table 1, bis-(trichloroacetyl) peroxide would assay about zero percent active peroxide if it were to be stored for three weeks under the same conditions. Bis-(perchloroacrylyl) peroxide is likewise much less dangerous to handle because of these properties. Still another outstanding feature in using bis-(perchloroacrylyl) peroxide is this peroxide's stability to multivalent metals as shown in Table 3, below. The data for Table 3 were collected as follows: ten grams of a 10 percent solution of bis-(perchloroacrylyl) peroxide in Freon 11 were placed in a one-inch test tube, a thermometer was suspended in the solution in the test tube, and the solution was cooled to minus 70 degrees centigrade. Then one gram of the multivalent metal was added to the cold solution and the mixture slowly warmed at the rate of about four centigrade degrees per minute to 26 degrees centigrade. The observed results are shown in the second column of Table 3.

Table 3.—Stability of bis-(perchloroacrylyl) peroxide to multivalent metals

| Example Number | Compounds Tested | Results |
|---|---|---|
| 1 | Reduced iron | No reaction. |
| 2 | Iron rust | Do. |
| 3 | Red lead oxide (Pb₃O₄) | Do. |
| 4 | Lithium carbonate (Li₂CO₃) | Do. |
| 5 | Cupric Sulfate (CuSO₄) | Do. |
| 6 | Black ferric oxide (Fe₂O₃) | Do. |
| 7 | Aluminum trichloride | Reaction occurred at minus 10° C. Considerable amount of gas evolved. Exothermic. |
| 8 | Potassium permanganate | No reaction. |
| 9 | Mercurous chloride | Do. |
| 10 | Mercuric chloride | Do. |
| 11 | Ferric chloride | Slow evolution of gas at 0° C. Not exothermic. |
| 12 | Ferrous chloride | Minute evolution of gas at plus 10° C. |
| 13 | Cobalt chloride | Do. |
| 14 | Cobalt trifluoride | No apparent reaction. |
| 15 | Cuprous chloride | No reaction. |
| 16 | Cupric chloride | Do. |
| 17 | Manganous chloride | Do. |
| 18 | Zinc chloride | Do. |
| 19 | Stannous chloride | Do. |
| 20 | Lead chloride | Do. |
| 21 | Aluminum foil +HCl | Gas evolved at 0° C. Slightly exothermic. |

In effecting the polymerization process of this invention the variables of temperature and promoter concentration are interrelated especially with respect to producing solid polymers. If the temperature is held constant over a series of runs and the promoter concentration varied, the No Strength Temperature (NST) values of the solid polymer produced can be varied. Likewise if the promoter concentration is maintained constant over a series of runs, the NST values of the solid polymers produced change with changes in temperature. In general at a constant promoter concentration the NST value of the solid polymer is decreased with increasing temperature, and at a constant temperature the NST values of the solid polymer decrease with increases in promoter concentration. Promoter concentrations between 0.005 and 5.0 percent by weight of the bis-(perhaloacrylyl) peroxide may be used to produce solid polymers and the range between 0.02 and 1.0 percent is preferred. Solid polymers may be produced by the polymerization process of this invention using temperatures as high as 50 and as low as minus 20 degrees centigrade and the range between zero and 35 degrees centigrade is preferred. Liquid, wax-like or grease-type, polymers may be produced at temperatures as high as 80 degrees centigrade by using the bis-(perhaloacrylyl) peroxide promoter of this invention.

In order that this invention may be more fully understood, the following additional examples are given illustrating preferred embodiments. They are not to be construed as limiting the invention except as defined in the appended claims.

*Example 22.*—A Monel autoclave was thoroughly cleaned and dried, then charged with 250 parts by weight of a 4 percent solution of bis-(trichloroacrylyl) peroxide in carbon tetrachloride and 650 parts by weight of substantially pure carbon tetrachloride. To this charge were added 125 parts by weight of chlorotrifluoroethylene monomer. The autoclave was closed and the reaction mixture was heated to a temperature of about 45 degrees centigrade with continuous agitation for a period of sixteen hours. At the end of this time the contents of the autoclave were cooled, discharged and the carbon tetrachloride and unreacted monomer stripped off through a distillation column. An 85 percent yield of white solid polychlorotrifluoroethylene was recovered.

*Example 23.*—To a stainless steel autoclave were charged 12,000 parts by weight of chloroform, 25 parts by weight of bis-(perchloroacrylyl) peroxide dissolved in 163 parts by weight of carbon tetrachloride and 500 parts by weight of chlorotrifluoroethylene monomer. The charge was heated to a temperature of 65 degrees centigrade and agitated over the course of four hours, after which time the contents were discharged with the chloroform, carbon tetrachloride and unreacted monomer being removed by distillation. A 65 percent yield of soft grease-like polymeric chlorotrifluoroethylene having an average molecular weight of about 1,000 was recovered.

*Example 24.*—To a stainless steel autoclave were charged 12,000 parts by weight of chloroform, 25 parts by weight of bis-(perchloroacrylyl) peroxide dissolved in 69 parts by weight of carbon tetrachloride and 500 parts by weight of chlorotrifluoroethylene monomer. The reaction charge was heated to a temperature of 80 degrees centigrade and agitated for a period of four hours, after which the contents of the autoclave were cooled and discharged, with the chloroform, carbon tetrachloride and unreacted monomer being distilled off. A 68 percent yield of an oily polymeric chlorotrifluoroethylene having a molecular weight of about 700 was recovered.

*Example 25.*—A 3-liter Monel bomb was cooled with Dry Ice before charging 2700 grams of chloroform and 21 grams of bis-(perchloroacrylyl) peroxide contained in 118 grams of Freon 11. The bomb was sealed and evacuated in order to add 295 grams of chlorotrifluoroethylene monomer. Thus the peroxide concentration, based on the weight of the monomer, was 7.1 percent. These reactants were then heated to 50 degrees centigrade for 7 hours. At the conclusion of the run and after the solvent and unreacted monomer had been distilled off, it was found that there had been a 97.8 percent conversion of the monomer to a heavy wax which had a viscosity of 81.79 centistokes at 99 degrees centigrade.

Table 4 shows the results of three runs conducted in a manner similar to that of Example 25, except that the solvent used was carbon tetrachloride rather than chloroform. These examples show the effect of time for reaction and catalyst concentration on the resultant polymer. The yields and conversions shown are calculated on the theory that there are no peroxide groups within or on the end of the homopolymer chains. The fact that this theory is not exactly correct is evidenced by the higher than theoretical values shown in the respective columns.

*Table 4.—The polymerization of chlorotrifluoroethylene in a solvent of carbon tetrachloride using a promoter of bis-(perchloroacrylyl) peroxide*

| Example Number | Weight of Monomer, gm. | Weight of Solvent, gm. | Percent of Peroxide Based on the Weight of Monomer | Polymerization Temperature, °C. | Reaction Time, Hr. | Percent Conversion | Percent Yield | Type of Polymer |
|---|---|---|---|---|---|---|---|---|
| 26 | 310 | 2,700 | 7 | 72 | 5.2 | 100 | 104 | Heavy wax. |
| 27 | 304 | 2,700 | 7 | 72 | 6.0 | 102 | 107 | Do. |
| 28 | 288 | 2,700 | 14 | 72 | 5.2 | 109 | 111 | Light wax. |

*Example 29.*—A Pyrex glass polymerization tube was thoroughly cleaned and dried before the addition of 0.310 gram of bis-(perchloroacrylyl) peroxide as a 7.9 percent solution in Freon 11. The tube was cooled to minus 70 degrees centigrade under a blanket of oxygen-free nitrogen and then twice successively evacuated and purged with oxygen-free nitrogen. The polymerization tube was again evacuated preparatory to adding 31.54 grams of chlorotrifluoroethylene monomer. When the desired amount of monomer had been added to dilute the peroxide concentration to 1.0 percent by weight of the monomer charged, the polymerization tube was sealed under a blanket of purified nitrogen, placed in a constant temperature bath and held at 15 degrees centigrade for 7 days. The tube was then cooled in a Dry Ice methanol bath, blown open and warmed to remove the Freon 11 and unreacted monomer. It was found that 88.5 percent of the monomer had been converted to a solid polymer. This solid polymer thus obtained was subjected to an acetone extraction for 4 hours and two standard No Strength Temperature tests (NST) were made on the extracted material. The NST results of this example were 295.0 and 299.0 degrees centigrade respectively to give an average NST value of 297.0 degrees centigrade.

Table 5 shows the results of five runs conducted in a manner similar to that of Example 29. The tabular results of Example 29 are also shown for comparative purposes.

*Table 5.—The bulk polymerization of chlorotrifluoroethylene in a solvent of Freon 11 using a promoter of bis-(perchloroacrylyl) peroxide to produce a solid polymer*

| Example Number | Weight of Monomer, gm. | Percent of Peroxide Based on the Weight of Monomer | Polymerization Temperature, °C. | Reaction Time in Days | Percent Conversion | NST Value (Ave. of 2 Tests) °C. |
|---|---|---|---|---|---|---|
| 29 | 31.54 | 1.0 | 15 | 7 | 88.5 | 297.0 |
| 30 | 31.61 | 0.493 | 30 | 14 | 102.5 | 240.5 |
| 31 | 31.66 | 0.168 | 30 | 14 | 96.2 | 250.0 |
| 32 | 32.04 | 0.075 | 15 | 14 | 43.3 | 315.5 |
| 33 | 31.28 | 0.035 | 30 | 7 | 26.3 | 270.5 |
| 34 | 31.21 | 0.035 | 30 | 21 | 69.1 | 267.5 |

*Example 35.*—To a cold 3-liter Monel bomb were charged 1200 grams of chloroform, 21 grams of 1,1-dichloro-2,2-difluoroethylene monomer and 12.5 grams of bis-(perchloroacrylyl) peroxide in 74.5 grams of Freon 11. The bomb was sealed and evacuated before charging 209 grams of chlorotrifluoroethylene monomer. The bomb was heated to about 72 degrees centigrade for four hours. At the conclusion of this experiment after the solvent and unreacted monomer had been distilled off, the product gave a yield of 36.9 percent of grease-like material having a chlorine content of 35.7 percent.

*Example 36.*—A 3-liter Monel bomb was cooled with Dry Ice before adding 2700 grams of chloroform, 300 grams of 1,1-dichloro-2,2-difluoroethylene monomer and 21 grams of bis-(perchloroacrylyl) peroxide in 96 grams of Freon 11. The bomb was sealed and evacuated before rocking at 72 degrees centigrade for 5 hours. Upon removal of the Freon 11 and unreacted monomer, a conversion of 26 percent of a liquid polymer was obtained. The chlorine content of the product was 67.2 percent.

By weight, 10 parts of the product of 1,1-dichloro-2,2-difluoroethylene polymerized in a manner after Example 36 was dissolved in 10 parts of a standard silicone oil (9996–100), and at minus 55 degrees centigrade, this solution became cloudy but remained fluid.

*Example 37.*—The 3-liter Monel bomb was cooled with Dry Ice and charged with 21 grams of bis-(perchloroacrylyl) peroxide in 118 grams of Freon 11 and 300 grams of 1,1-dichloro-2,2-difluoroethylene monomer. The run was made at 50 degrees centigrade for 7½ hours. A conversion of 22.3 percent of a liquid polymer was obtained.

*Example 38.*—A Pyrex glass polymerization tube was thoroughly cleaned, dried and purged with oxygen-free nitrogen. The tube was charged while under a blanket of pure nitrogen with 0.24 gram of bis-(perchloroacrylyl) peroxide as a 1.0 percent solution in Freon 11 and 24.6 grams of 1,3-hexafluorobutadiene. The tube was sealed and placed in a refrigerator maintained at 10 degrees centigrade. The solution in the tube at the beginning of the run was clear and colorless. After three days, the solution turned cloudy and after five days, white solids had settled to the bottom of the polymerization tube.

Samples of the solid polychlorotrifluoroethylene polymer prepared in a manner after the foregoing examples were critically evaluated in commercial testing equipment and compared with samples of polymer made available on the market by employing the perhalogenated acetyl peroxide polymerization promoter of the prior art. Table 6 illustrates that the rate of degradation of polymer produced in accordance with this invention is slower than that exemplified by the prior art techniques of polymerization, especially insofar as No Strength Temperature (NST) values are concerned.

Although we do not intend to be limited to any theory we believe the added stability illustrated above may be due to the double bond of the bis-(perhaloacrylyl) peroxide used in promoting the polymerization process of this invention.

The polymerization promoters of the present invention may be employed to affect the polymerization of various monomers comprising the fluorine containing perhalogenated olefins to produce desired polymers having liquid, wax, grease-like, or solid consistency. Among the specific materials which may be polymerized, and which are contemplated as being within the scope of this invention are: chlorotrifluoroethylene, tetrafluoroethylene, trifluorobromoethylene, 1,1-dibromo-2,2-difluoroethylene, cis- and trans-1,2-dichloro-1,2-difluoroethylene, cis- and trans-1,2-dibromo-1,2-difluoroethylene, 1,1 - difluoro - 2 - chloro-2-bromoethylene, hexafluorobutadiene, 2-chloropentafluorobutadiene, tetrafluoroallene, etc., and mixtures and copolymers thereof. The promoters may also be employed in making copolymers of the various perhalo-olefins disclosed herein with each other or with still other monomeric materials containing a sufficient amount of halogen to impart the properties desired into the final polymeric material. For example, copolymers of chlorotrifluoroethylene with various proportions of monomers such as vinyl chloride, vinyl fluoride, vinylidene chloride, hexafluorobutadiene, etc., may be prepared employing bis-(perhaloacrylyl) peroxide polymerization promoters of this invntion.

The polymerization of the perhalo-olefins in accordance with this invention may be carried out in solvents, dispersions or in emulsions if desired.

The bis-(perhaloacrylyl) peroxides that may be employed in accordance with this invention are, for example, bis-(trichloroacrylyl) peroxide, bis-(trifluoroacrylyl) peroxide and the mixed fluoro-chloroacrylyl peroxides such as the bis-(dichlorofluoroacrylyl) peroxides and the bis-(chlorodifluoroacrylyl) peroxides. In addition, the bis-(perchlorobromoacrylyl) peroxides and the bis-(perbromofluoroacrylyl) peroxides also may be employed. These compounds may be prepared by the method of Boeseken and Gelissen Rec. Trav. Chim. 43, 266–8 (1924). Also see Chem. Abstracts 18, 2128 (1924), which involves the reaction of the proper acid chloride, such as the trichloroacrylyl chloride with hydrogen peroxide in the presence of sodium hydroxide to produce trichloroacrylyl peroxide. A method for the preparation of the trichloroacrylyl chloride, from which the peroxide can be prepared, is disclosed in U. S. Patent 2,665,307.

We claim:

1. In the process for polymerizing fluorine-containing perhalo-olefins, the improvement which comprises employing a bis-(perhaloacrylyl) peroxide as the polymerization promoter.

*Table 6.—Comparative date of bis-(trichloroacetyl) peroxide and bis-(perchloroacrylyl) peroxide in the preparation of solid polymers from the bulk polymerization of chlorotrifluoroethylene monomer*

| Run | Promoter | Weight Percent of Promoter Based on The Monomer | Reaction Time, Days | Reaction Temp., °C. | NST (Average of 3 Tests) °C. | Percent Conversion |
|---|---|---|---|---|---|---|
| 39 | bis-(Trichloroacetyl) peroxide | 0.975 | 7 | minus 15 | 261 | 83.7 |
| 40 | bis-(Perchloroacrylyl) peroxide | 1.00 | 7 | plus 15 | 297 | 88.5 |
| 41 | bis-(Trichloroacetyl) peroxide | 0.534 | 14 | minus 15 | 280 | 91.3 |
| 42 | bis-(Perchloroacrylyl) peroxide | 0.496 | 14 | plus 15 | 293 | 99.2 |
| 43 | bis-(Trichloroacetyl) peroxide | 0.150 | 21 | minus 2 | 319 | 33.9 |
| 44 | bis-(Perchloroacrylyl) peroxide | 0.163 | 21 | plus 15 | 301 | 88.2 |

In addition, polymer produced in accordance with this invention appears to possess characteristics in compression molding, injection molding, extrusion molding, etc., which are superior to polymers produced with the perhaloacetyl peroxide promoters of the prior art.

2. The process which comprises effecting the polymerization of a fluorine-containing perhalo-olefin in the presence of a bis-(perhaloacrylyl) peroxide at temperatures between about minus 20 and about plus 80 degrees centigrade and recovering a polymeric material therefrom.

3. The process of claim 1, wherein the fluorine-containing perhalo-olefin is chlorotrifluoroethylene.

4. The process of claim 1, wherein the fluorine-containing perhalo-olefin is 1,1-dichloro-2,2-difluoroethylene.

5. The process of claim 1, wherein the fluorine-containing perhalo-olefin is 1,3-hexafluorobutadiene.

6. The process of claim 2, wherein the bis-(perhaloacrylyl) peroxide is bis-(trichloroacrylyl) peroxide.

7. The process of claim 6, wherein the bis-(trichloroacrylyl) peroxide is present in about 0.005 and 5.0 percent by weight of the fluorine-containing perhalo-olefin.

8. The process which comprises effecting the polymerization of chlorotrifluoroethylene in the presence of between about 0.005 and about 5.0 percent by weight of bis-(trichloroacrylyl) peroxide at a temperature of between about minus 20 and about plus 80 degrees centigrade and recovering a polymer therefrom.

9. The process for producing a solid polymer of chlorotrifluoroethylene which comprises effecting the polymerization of chlorotrifluoroethylene in the presence of between about 0.02 and about 1.0 percent by weight of bis-(trichloroacrylyl) peroxide at a temperature of between about minus 20 and about plus 50 degrees centigrade and recovering the solid polymer therefrom.

References Cited in the file of this patent
UNITED STATES PATENTS

| | | |
|---|---|---|
| 2,580,373 | Zimmerman | Dec. 25, 1951 |
| 2,593,399 | Park | Apr. 22, 1952 |